Jan. 20, 1942.                H. T. DOW                2,270,516
                           VEHICLE SPRING
                         Filed April 22, 1940
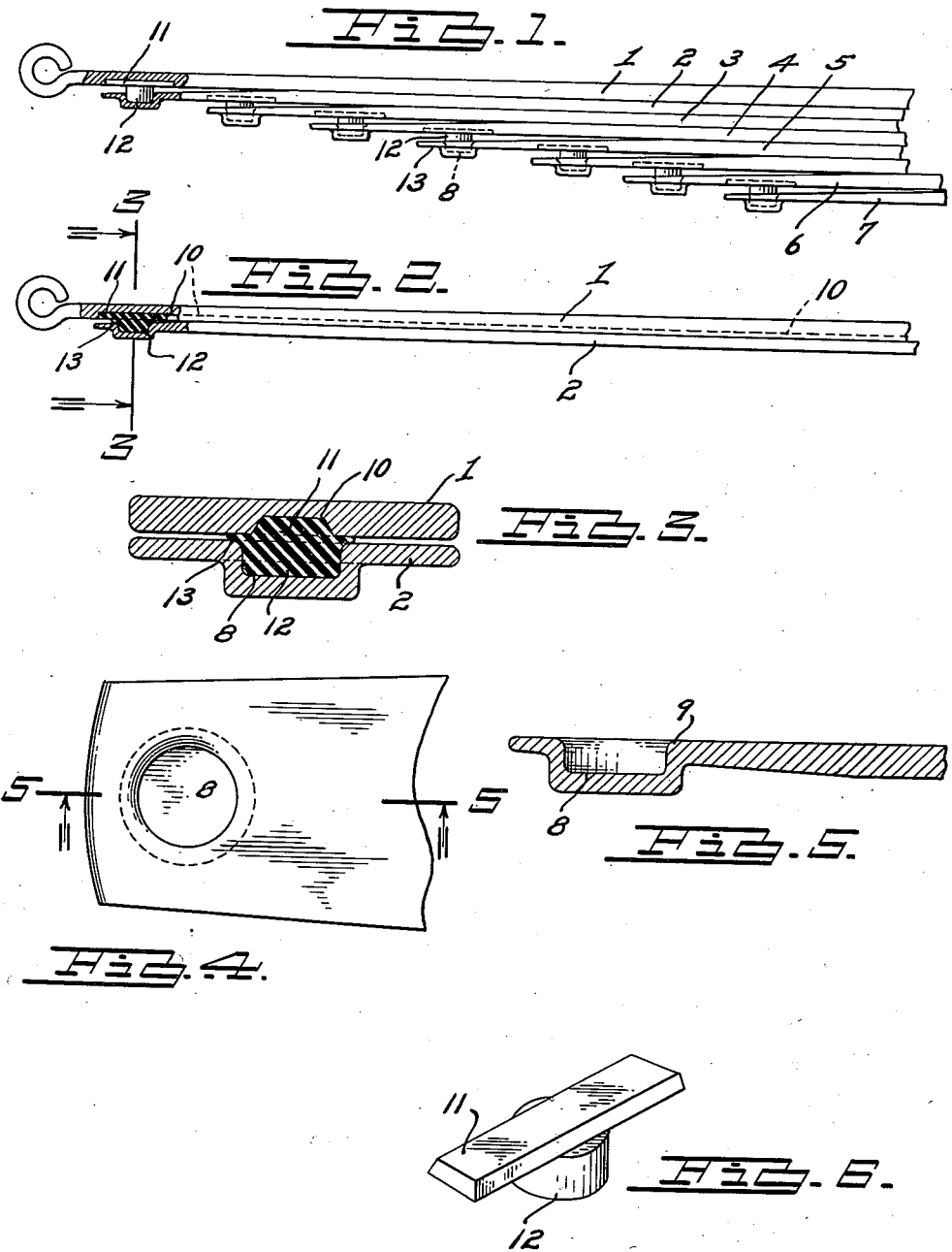
INVENTOR.
Harold T. Dow
BY
ATTORNEY.

Patented Jan. 20, 1942

2,270,516

UNITED STATES PATENT OFFICE 2,270,516

VEHICLE SPRING

Harold T. Dow, Elma, N. Y., assignor to Spring Perch Company, Inc., a corporation of New York Application April 22, 1940, Serial No. 330,816

7 Claims. (Cl. 267—47)

This invention relates to vehicle springs of the multi-leaved elliptic or semi-elliptic type and the object of the invention is to provide a new and improved means for securing a predetermined dampening effect to provide the required reaction under specific load.

Springs of the elliptic or semi-elliptic type as heretofore made are usually in frictional contact throughout their length providing an undeterminable factor and furthermore clips are ordinarily utilized to prevent lateral displacement of the spring leaves.

The principal feature of this invention resides in the provision of inserts of an improved construction to provide a peripheral and laterally unconfined flange of rubber between the leaves and in association with said inserts a slab or strip of rubber integral with the body of the insert and fitting a groove or recess provided in the under surface of the contiguous upper leaf whereby when the leaves are assembled not only is the high static pressure between the leaves varied to provide a predetermined dynamic frictional contact between the leaves by which a predetermined dampening effect may be produced but relative lateral displacement between the leaves is prevented. A rubber insert of proper composition will flow or yield under variation in pressures applied to the same by deformation of the insert and provides a flange of rubber between the leaves separating the same a distance from the ends thereby predetermining the area of frictional contact between the leaves and as the insert engages in the opposed recesses of contiguous leaves lateral displacement and resultant friction between the leaves is eliminated.

These and other objects and features of the invention are hereinafter more fully described and claimed and a structure illustrating my improved vehicle spring and manner of utilization of the inserts in calibrating the same for specific load is shown in the accompanying drawing in which—

Fig. 1 is an elevation partly in section of a portion of a multi-leaved spring showing my improved construction including inserts with the leaves in spread position prior to assuming normal relationship.

Fig. 2 shows an elevation partly in section of two leaves of the spring in the normal position under load.

Fig. 3 is an enlarged cross section taken on line 3—3 of Fig. 2.

Fig. 4 is a plan view of the end of a leaf showing the socket for the insert.

Fig. 5 is a section taken on line 5—5 of Fig. 4.

Fig. 6 is a perspective view of the insert.

Vehicle springs of the multi-leaved type, as heretofore made, cannot be accurately calibrated for specific load as the frictional area, when no inserts are used, is the total area of the leaves in contact under which condition the variation in the length of the leaves provides the sole means for determining the dampening area and when inserts were used they were all of the same dimension both in cross sectional area and height.

Furthermore, as heretofore made, the leaves were provided with spring clips of well known form and still commonly in use to prevent lateral displacement of the spring leaves and the leaves were of a uniform cross sectional area and required considerably more metal in manufacture thereof to secure the load sustaining effect.

By my improved form of spring, a groove extending longitudinally of the under side thereof intermediate the opposite side edges reduces the amount of metal required for the purpose and provides a means in association with my improved insert to prevent lateral displacement thus dispensing with the spring clips heretofore used. Furthermore, the high pressure point between the leaves and the resultant high static friction has been eliminated and the dampening factor is determined by the retention of a predetermined braking action directly related to the specific high static pressure between contiguous leaves to thereby secure a smooth action under specific load.

From the following description and the drawing it is firstly to be understood the term "elliptic type" is intended to apply to various forms either a fourth or a half elliptic or two full half elliptics joined at the terminal ends. I have, however, only illustrated the half elliptic form as one skilled in the art will understand readily how the quarter or full elliptic spring would be constructed to secure the desired dampening effect under specific load.

In Fig. 1 I have shown a spring formed of leaves 1, 2, 3, 4, 5, 6 and 7 and each of the leaves, except the upper leaf 1, is formed with a recess 8 adjacent its free end, the wall of which at the surface of the leaf is outcurved as at 9, shown more clearly in Fig. 5. The under side of each of the leaves 1 to 6, at least, is formed with a recess 10 which may extend the full length of each leaf to provide a groove as shown by the dotted lines in Fig. 2. Insofar as the insert itself is concerned, however, the groove need only be of a length to receive the slab or strip 11 formed integrally with the upper end of the circular body 12 of the insert. The body of the insert is of a cylindrical form, as will be understood from Fig. 6, and fits the recess 8 in the respective leaves and it is of vertical height greater than the depth of the recess. Thus after the insert has been positioned between the spread leaves as shown in Fig. 1 and the leaves relieved of the separating strain the cylindrical body 12 will, under the pressure between the leaves, flow outwardly over the rounded edges 9 of the recess to provide a flange 13 between the leaves tending to maintain the same separated at the ends and inwardly from the said ends a distance depending upon the vertical height of the cylindrical portion 12 of the insert and thus vary the total area of the leaves in contact, and predetermine the dynamic friction or braking action therebetween. The height of the portion 12 of the insert is the factor determining the dynamic friction between the leaves and the slab or strip 11 of the insert, which lies in the groove or recess 10 of an upper leaf, is in pressure engagement therewith and prevents lateral displacement of the leaves as will be more clearly understood from Fig. 3.

Usually for a specific spring and a specific load the cylindrical portions 12 of the inserts are all of the same type but may be varied in height to provide greater or less area of contact between any two leaves of a series.

The depressions are preferably of cylindrical form and it is desirable that the rubber be of such composition that it will tend to flow under relative movement between the leaves in contact therewith and to prevent a sliding contact therewith which would provide an undeterminable factor of friction. The material, therefore, of which the inserts are preferably formed should be substantially as follows: the commonly known black rubber stock of a uniform hardness, namely at 72 degrees F. temperature, 63 to 67 and at zero F. 75 maximum on a Shore durometer. It further should have a tensile strength of 3200 pounds per square inch and an elongation of 600 per cent and a compression set test equal to 400 pounds pressure on the rubber section used in an oven at 158 degrees F. for twenty-two hours, the dimension being taken ten minutes subsequent to the removal from the oven set test not to exceed 6 per cent of the dimension.

The invention is not confined to the specific composition but the composition above stated has been found very practical in use.

It will be observed from the foregoing that while two springs may be alike in respect to length and number of leaves it may be adapted for use with differing supported loads or body weight and thus one standard spring may be calibrated for much or little friction depending upon the effect desired by utilizing and variably positioning inserts of various body heights to adjust the dampening area for certain load or for differing reaction from deflection under specific load. The spring is adapted or calibrated for specific load to variations of contact area between successive leaves and is the sole fact to be considered irrespective of the number or the length of the leaves which may be varied depending upon the load. It is further obvious that the diameter of the body of the insert may be varied, the diameter being greater for use with leaves of a greater width and thickness for heavy loads and less in diameter with leaves of less width and/or thickness for lighter loads and that the inserts are adaptable for use between spring leaves of various forms whether the spring be attached at the small or large end to the load supporting element with the free end attached to a support or to the free end of a like spring element.

From the foregoing description it is believed evident that the various objects and features of the invention are attained by the structure described and that various changes may be made without departing from the spirit and scope of the invention as set forth in the appended claims.

Having thus fully described my invention, its utility and mode of operation, what I claim and desire to secure by Letters Patent of the United States is:

1. A leaf spring assembly comprising a plurality of leaves arranged in successive pairs, one leaf of each pair having the surface thereof facing the other being provided with a recess and the surface of the other facing the first being formed with a depression less in cross sectional area than that of the recess of the first leaf, a compressible bearing element in each of the depressions of a height greater than the combined depth of the depressions of the successive pairs of leaves, said bearing element having a portion fitting the depression of one leaf and a portion fitting the recess of the other providing a means whereby lateral displacement of the leaves is prevented and a predetermined dampening area provided, the compression of the bearing element by the opposed leaves causing a portion thereof to be extruded to between opposed surfaces of the leaves.

2. In a leaf spring assembly, a pair of spring leaves, one being of greater length than the other, the longer leaf having a recess in the surface thereof facing the shorter and the shorter leaf being formed with a depression less in cross sectional area than the recess of the first leaf, a rubber bearing element having a portion fitting in the depression and an integral portion lying in the recess, the total height of the bearing element being such as to separate the leaves a distance from the end thereof and to provide a flange between the leaves to secure a predetermined area of frictional contact between the leaves, the arrangement preventing material lateral displacement of the leaves.

3. In a leaf spring assembly, a pair of spring leaves, one being of greater length than the other, each of the leaves being provided with a recess in the respective opposed faces thereof, the recess of one leaf being greater in cross sectional area than that of the other, a bearing element having respective portions thereof fitting the depressions of the two leaves, said bearing element formed of rubber stock having a total height sufficient to separate the leaves to provide a rubber flange between the opposed surfaces of the leaves and thereby separate the leaves a distance from the insert thereof to provide a predetermined area of frictional contact between the leaves, said bearing element further preventing material lateral displacement of the leases.

4. In a leaf spring assembly, a pair of spring leaves, one being of greater length than the other, one of the leaves having a recess in the surface thereof facing the other extending longitudinally of the leaf providing a groove between the side edges thereof, the surface of the other leaf having a recess of comparatively small cross sectional area, a bearing element having a body portion fitting the said recess and a strip portion engaging in the groove of the other with the side edges of the strip engaging the opposite side walls of the groove to prevent lateral displacement of the leaves when in final assembled relation, the total height of the insert transversely of the leaves being greater than the combined depth of the recess and the groove of the respective leaves to separate the same a distance inwardly from the insert to provide a predetermined area of frictional contact between the leaves.

5. In a leaf spring assembly, a series of spring leaves arranged in pairs, the leaves of each pair being of different lengths, and each of less length than the respective leaves of the preceding pair, the longer leaf of each pair having a recess in the surface thereof facing the other extending longitudinally of the leaf providing a groove between the side edges thereof, the surface of the other leaf of each pair having a cylindrical recess of greater diameter than the width of the groove, a rubber bearing element having a cylindrical body portion fitting in said recess, and a flat strip portion lying longitudinally of the groove of the other with side edges of the strip engaging opposite side walls of the groove to prevent lateral displacement of the leaves when in final assembled relation, the overall height of the bearing element transversely of the leaves being greater than the combined depth of the recess and the groove of the respective leaves whereby the leaves, when relieved of the separating strain, place the bearing element under compression providing a flange between the opposed faces of the leaves and separating the same a distance inwardly from the insert to provide an area of frictional contact between the leaves determined by the thickness of the said compressed flange of the bearing element, thereby providing a predetermined area of frictional contact between the leaves.

6. In a leaf spring assembly, a series of spring leaves arranged in pairs, the leaves of each pair being of different lengths and each of less length than the corresponding leaves of the preceding pair, the shorter leaf of each pair having a cylindrical recess in the surface thereof facing the longer leaf and the opposed surface of the longer leaf having a shallow recess extending longitudinally thereof of a length greater than the diameter of the cylindrical recess of the shorter leaf, a rubber bearing element having a cylindrical body portion fitting in the cylindrical recess of the shorter leaf and being of a height greater than the depth of the recess, said bearing element further including an integral flat strip of a width less than the diameter of the said body and of length greater than the diameter of the body for engaging the recess of the longer leaf with the side edges of the strip fitting the side walls of the recess, the said strip portion providing a means preventing lateral displacement of the leaves in the normal use of the spring, the whole providing a structure wherein the surface of the longer leaf on each side of the recess engages the end of the body on each side of the strip thereby deforming the said body portion at the junction with the strip to provide a flange of rubber between the opposed surfaces of the leaves adjacent the said recess and maintaining the leaves normally separated at the insert a distance determined by the height of the said cylindrical body portion thereof to thereby provide a predetermined area of frictional contact between the successive pairs of leaves.

7. In a leaf spring assembly, a pair of leaves of spring metal normally in surface contact one with the other, each of the leaves adjacent the load supporting end having a recess in the respective opposed surfaces in oppositely disposed relation, a rubber insert normally greater in height than the combined depth of the two recesses positioned therein, the tendency of the leaves to return to surface contact subsequent to being spread at the said ends to permit introduction of the insert, compressing and deforming the insert to provide a rubber flange of a thickness transversely of the leaves dependent upon the height of the insert in excess of the combined depth of the two recesses, thereby maintaining the leaves at their load supporting ends spread apart a distance from the insert determined by the thickness of the flange, said insert in the stated relationship resisting shearing stresses to which it may be submitted in normal conditions of use, thereby preventing lateral displacement of the leaves.

HAROLD T. DOW.